United States Patent
Ohashi et al.

(10) Patent No.: US 7,939,028 B2
(45) Date of Patent: May 10, 2011

(54) APPARATUS AND METHOD FOR CONTINUOUS HIGH TEMPERATURE GAS TREATMENT OF PARTICULATE MATTER

(75) Inventors: Hiroaki Ohashi, Iwaki (JP); Masaru Kagoshima, Iwaki (JP); Yoshiki Shigaki, Iwaki (JP)

(73) Assignee: Kureha Corporation, Tokyo (JP)

( * ) Notice: Subject to any disclaimer, the term of this patent is extended or adjusted under 35 U.S.C. 154(b) by 79 days.

(21) Appl. No.: 12/223,822

(22) PCT Filed: Dec. 4, 2006

(86) PCT No.: PCT/JP2006/324156
§ 371 (c)(1),
(2), (4) Date: Aug. 11, 2008

(87) PCT Pub. No.: WO2007/094114
PCT Pub. Date: Aug. 23, 2007

(65) Prior Publication Data
US 2009/0060826 A1 Mar. 5, 2009

(30) Foreign Application Priority Data

Feb. 14, 2006 (JP) .................................. 2006-036170

(51) Int. Cl.
*B01J 8/08* (2006.01)
*B01J 8/18* (2006.01)

(52) U.S. Cl. ........ 422/198; 422/199; 422/202; 422/228; 422/232; 422/233; 422/139; 422/146; 422/216

(58) Field of Classification Search .................. 422/139, 422/146, 198, 199, 202, 228, 232, 233, 216
See application file for complete search history.

(56) References Cited

U.S. PATENT DOCUMENTS 4,221,560 A * 9/1980 Idei et al. ........................ 432/99
(Continued)

FOREIGN PATENT DOCUMENTS

JP 58-199037 11/1983
(Continued)

OTHER PUBLICATIONS

International Search Report issued in the International (PCT) Application of which the present application is the U.S. National Stage.

*Primary Examiner* — Jennifer A Leung
(74) *Attorney, Agent, or Firm* — Wenderoth, Lind & Ponack, L.L.P.

(57) ABSTRACT

An apparatus for continuous high temperature gas treatment of particulate matter including a starting material supply port (1) through which starting particulate matter is supplied from an upper part of the apparatus; a treatment gas supply port (2) through which a treating gas is supplied; a product discharge port (3) through which a product after treatment is discharged from a lower part of the apparatus; a treatment chamber (4) in which the particulate matter is treated with the treatment gas; a gas-solid separation chamber (5) provided in fluid communication with an upper part of the treatment chamber (4); and a cooling chamber (6) provided in fluid communication with a lower part of the treatment chamber (4). A heater (7) is provided on the outer periphery of the upper part of the treatment chamber (4), and a cooler (8) is provided on the outer periphery of the cooling chamber (6).

20 Claims, 2 Drawing Sheets

U.S. PATENT DOCUMENTS

| | | | |
|---|---|---|---|
| 4,224,286 A * | 9/1980 | Murase et al. | 422/205 |
| 4,261,857 A * | 4/1981 | Nakao | 502/5 |
| 4,421,523 A | 12/1983 | Mehta et al. | |
| 4,997,363 A | 3/1991 | Hundebol | |

FOREIGN PATENT DOCUMENTS

| | | | |
|---|---|---|---|
| JP | 58208114 A * | 12/1983 | |
| JP | 59-81414 | 5/1984 | |
| JP | 59-176583 | 10/1984 | |
| JP | 60-174235 | 9/1985 | |
| JP | 1-109799 | 7/1989 | |
| JP | 1-247519 | 10/1989 | |
| JP | 2-243545 | 9/1990 | |
| JP | 05296413 A * | 11/1993 | |
| JP | 6-277495 | 10/1994 | |

* cited by examiner

APPARATUS AND METHOD FOR CONTINUOUS HIGH TEMPERATURE GAS TREATMENT OF PARTICULATE MATTER

BACKGROUND OF THE INVENTION

1. Technical Field

This invention relates to an apparatus for continuous high temperature gas treatment of particulate matter, in which a fluidized bed and a moving bed are continuously formed during the operation of the apparatus; and a method for treating particulate matter with the use of the treatment apparatus.

2. Description of the Related Art

High temperature gas treatment, such as drying, firing, calcination, or high temperature gas reaction, of organic or inorganic particulate matter is performed usually by bringing starting particulate matter into contact with an atmosphere gas, such as air, nitrogen, steam, a combustion gas, or a reactant gas, for a certain period of time at a high temperature of 100 to 3000° C. The mode of contact between the particulate matter and the treating gas is, for example, a fixed bed mode as in a tunnel furnace, a moving bed mode as in a rotary kiln, or a fluidized bed mode such as a stirred bed and an air bubble fluidized bed. In the case of the fixed-bed or moving-bed contact mode, a temperature distribution is apt to occur within each bed, thus rendering uniform contact between the particulate matter and the gas difficult. In the case of the fluidized-bed contact mode, on the other hand, there is an improvement in the temperature distribution or the gas contact, but a completely mixed state is achieved within the bed. During continuous operation, therefore, a treating time distribution occurs and tends to bring a nonuniform product (see "Kagaku Kogaku Binran, Kaitei 6-pan" (A Guide to Chemical Engineering, Revised 6th Ed.), page 458, edited by the Society of Chemical Engineers, Japan, published by Maruzen Co., Ltd.). Thus, a batch operation is usually performed frequently.

If the batch operation is performed using the fluidized bed, uniform treatment becomes possible. However, the operation performed is such that after the starting material is charged into the furnace, the furnace is heated to initiate the reaction and, after completion of the reaction, the furnace is cooled, followed by discharging the treated material. This requires that the temperature of the apparatus be raised or lowered for each batch, entailing great losses not only in time, but in energy. Moreover, thermal stress and strain due to such temperature changes occur repeatedly, tending to pose a problem such as deterioration of the structural material of the furnace.

A known effective way of obtaining a uniform product with the use of the continuous fluidized bed is to provide the apparatuses at multiple stages in series in the direction of a treatment flow so that mixing in the direction of the treatment flow will be decreased to narrow the residence time distribution within the apparatus (see Terukatsu Miyauchi, "Shin-Kagaku Kogaku Koza 14 "Ryukei Sosa to Kongou Tokusei" (A New Course in Chemical Engineering, 14, "Operation of Flow System and Mixing Properties"), pages 10-12, page 24, Nikkan Kogyo Shimbunsha Ltd. (Business & Technology Daily News) (1960)). In order to obtain uniform treatment as obtained with batch operation, however, the provision of the apparatuses in multiple stages as many as several tens of stages or more is needed, and this is impractical.

As described above, uniform high temperature gas treatment has hitherto required either the batch operation, or the provision of the apparatuses in multiple stages in a continuous system. This has presented difficulty in performing an operation for bringing the particulate matter and the treating gas into uniform contact for a certain period of time at a certain temperature.

Non-patent document 1: "Kagaku Kogaku Binran, Kaitei 6-pan" (A Guide to Chemical Engineering, Revised 6th Ed.), page 458, edited by the Society of Chemical Engineers, Japan, published by Maruzen Co., Ltd.

Non-patent document 2: Terukatsu Miyauchi, "Shin-Kagaku Kogaku Koza 14 "Ryukei Sosa to Kongou Tokusei" (A New Course in Chemical Engineering, 14, "Operation of Flow System and Mixing Properties"), pages 10-12, page 24, Nikkan Kogyo Shimbunsha Ltd. (Business & Technology Daily News) (1960)

SUMMARY OF THE INVENTION

It is an object of the present invention to provide an apparatus for continuous high temperature gas treatment of particulate matter, which can perform uniform high temperature gas treatment of particulate matter; and a method for treating particulate matter with the use of such an apparatus.

The apparatus for continuous high temperature gas treatment of particulate matter according to the present invention has been developed to attain the above object. This apparatus is an apparatus in which starting particulate matter is continuously supplied from an upper part of the apparatus, while a finished form of the particulate matter is discharged from a lower part of the apparatus and, a gas is continuously supplied from the outside of the apparatus into the apparatus and brought into contact with the particulate matter, whereafter an exhaust gas is discharged from the upper part of the apparatus, and wherein the particulate matter is heat-treated by heating with the supplied gas and/or the wall surface of the apparatus. This apparatus is characterized in that a moving bed is formed in a lower part of the interior of the apparatus, and a fluidized bed is formed at an upper part of the apparatus in a form continuous with the moving bed.

According to the present invention, there is provided an apparatus for continuous high temperature gas treatment of particulate matter, comprising: a starting material supply port through which starting particulate matter is supplied from the upper part of the apparatus; a treating gas supply port through which a treating gas is supplied; a product discharge port through which the product after treatment is discharged from the lower part of the apparatus; and a treatment chamber in which the particulate matter is treated with the treating gas, and wherein heating means is provided in the upper part of the treatment chamber, the moving bed is formed in the lower part of the treatment chamber, and the fluidized bed is formed to be continuous with the upper part of the moving bed, during operation of the apparatus.

Whether the moving bed is formed, or the fluidized bed is formed, within the apparatus is determined by the rate of the gas flowing upward within the bed. That is, if, during continuous treatment of the particulate matter, the rate of the gas flowing in the bed of the particulate matter is less than a minimum fluidization rate, the particulate matter is not fluidized, but forms the moving bed. If the rate of the gas is equal to or higher than the minimum fluidization rate, but is less than a terminal sedimentation rate, the fluidized bed is formed. The minimum fluidization rate and the terminal sedimentation rate of the particulate matter can be determined by a method known in the art. The rate of the gas within the apparatus is found by dividing a total gas volume flow rate by the horizontal cross-sectional area of the apparatus, the total gas volume flow rate being obtained by adding or subtracting the flow rate of a gas or the gas, which is produced or consumed upon contact between the particulate matter and the gas, to or from the flow rate of the gas supplied from the outside of the apparatus, and reflecting the temperature conditions at each location in the resulting flow rate.

Any suitable means known in the art, such as a gas diffuser, can be used for continuously supplying the treating gas from the outside of the apparatus. The position of mounting of the gas diffuser is preferably below the desired position where the fluidized bed is formed within the treatment chamber.

The apparatus for continuous high temperature gas treatment of particulate matter according to the present invention preferably further comprises a cooling chamber provided in fluid communication with the lower part of the treatment chamber. The cooling chamber cools the high temperature particulate matter after treatment. Any suitable heat exchange means, such as an air-cooler or water-cooler, can be used as a cooling means. The cooling means is preferably provided on the outer wall of the cooling chamber.

In the apparatus for continuous high temperature gas treatment of particulate matter according to the present invention, it is preferred that a position detecting means for detecting the height positions of the moving bed and the fluidized bed formed during operation of the apparatus be further provided in the treatment chamber. The position detecting means is preferably a static pressure detector. To bring the volumes and boundary positions of the fluidized bed and the moving bed into intended situations, it is common practice to mount the position detecting means, such as the static pressure detector, at an arbitrary position within the fluidized bed and/or the moving bed, such as the bottom of the apparatus or the position of installation of the gas diffuser. By so doing, it is possible to know the height of each bed, and find the volume of the bed from the height of the bed and the cross-sectional area of the bed. In order to perform high temperature gas treatment for a certain time in a continuous treatment mode, the starting particulate matter is supplied to the apparatus at a constant flow rate and, during this process, the finished form of the particulate matter is discharged such that the detection value of the height of each bed becomes constant; alternatively, the finished form of the particulate matter is discharged from the apparatus at a constant flow rate and, during this process, the starting particulate matter is supplied to the apparatus such that the detection value of the height of each bed becomes constant. By this measure, the residence time in each bed becomes constant, and constant treatment can take place.

In the apparatus for continuous high temperature gas treatment of particulate matter according to the present invention, it is preferred that a three-dimensional structure for ensuring a time during which the supplied particulate matter dwells in the upper part of the treatment chamber so as to be sufficiently heatable to the desired temperature be further provided in the upper part of the treatment chamber. The shape and the number of the three-dimensional structure are not limited. In order that the descending particulate matter and the ascending treating gas can contact each other satisfactorily, however, at least the three-dimensional structure located at the uppermost part is preferably a conical structure. Moreover, it is preferred to dispose a plurality of the conical structures in a height direction in a central part of the treatment chamber. It is more preferred to provide the three-dimensional structures, preferably the three-dimensional structures having a slight inclination, on the wall surface side of the treatment chamber so as to be staggered with respect to the three-dimensional structures provided in the central part. The side surface of the conical structure preferably has an inclination of 5 to 60 degrees, preferably 5 to 30 degrees. If the inclination angle is too small, the particulate matter falls with difficulty. If the inclination angle is too large, the drop resistance of the particulate matter decreases and the effect of promoting the heating of the particulate matter declines. Thus, the above-mentioned ranges are preferred. By providing such a three-dimensional structure in the upper part of the treatment chamber, the particulate matter can dwell for a long term in an upper part of the fluidized bed within the treatment chamber where the heating means is provided. The thus supplied low temperature particulate matter is sufficiently exposed to the hot treating gas heated by the heat from the heating means provided in the upper part of the treatment chamber, and is thereby heated fully. Thus, the entry of the insufficiently heated particulate matter into the fluidized bed or the moving bed is prevented. Such features are advantageous particularly in case the starting particulate matter produces a gas which adversely affects the high temperature gas treatment as it is heated and increased in temperature.

The apparatus for continuous high temperature gas treatment of particulate matter according to the present invention preferably further comprises a gas-solid separation chamber provided in fluid communication with the upper part of the treatment chamber. The gas-solid separation chamber separates the particulate matter engulfed in the gas ascending in the treatment chamber, and causes the particulate matter to fall into the treatment chamber again. The gas-solid separation chamber may be one simply configured in a funnel-like form, but any suitable gas-solid separation device may be used, if necessary. The cross-sectional area of the gas-solid separation chamber is preferably larger than the cross-sectional area of the treatment chamber. By setting the cross-sectional area of the gas-solid separation chamber to be larger than the cross-sectional area of the treatment chamber, the rate of the treating gas ascending within the treatment chamber can be lowered, the particulate matter can be prevented from being entrained by the gas discharged from the uppermost part of the apparatus to the outside of the apparatus, and a loss in the staring material can be avoided. To avoid an impediment to gas-solid separation in the gas-solid separation chamber, it is preferred to provide a conduit for supply of the starting particulate matter, the conduit extending to a lower part of the gas-solid separation chamber directly above the treatment chamber or extending into the treatment chamber. Furthermore, a separation device, such as a cyclone, may be additionally installed within the gas-solid separation chamber or at the outside of the apparatus.

The apparatus for continuous high temperature gas treatment of particulate matter according to the present invention preferably further comprises a heat shielding plate (three-dimensional structure) provided between the treatment chamber and the gas-solid separation chamber and serving as a barrier to heat transfer from the treatment chamber to the gas-solid separation chamber. By providing such a heat shielding plate, a heat loss due to heat transfer from the treatment chamber (fluidized bed and moving bed) to the gas-solid separation chamber can be curtailed, a temperature rise within the gas-solid separation chamber can be prevented, and the rate of the gas can be lowered to promote gas-solid separation. Preferably, the heat shielding plate is provided in nearly the center of the cross section of the treatment chamber, and has a cross-sectional area which is 20 to 90%, preferably 30 to 80%, of the cross-sectional area of the treatment chamber. The provision of the heat shielding plate of such a size does not greatly impede the flow of the treating gas or the particulate matter between the gas-solid separation chamber and the treatment chamber. It is particularly preferred that the heat shielding plate be the above-mentioned conical three-dimensional structure.

In the apparatus for continuous high temperature gas treatment of particulate matter according to the present invention, it is preferred that a stirring means be further provided in the treatment chamber. Particularly if the stirring means is provided at a position where the fluidized bed is formed, gas diffusion can be performed satisfactorily. If the stirring means is provided at a position where the moving bed is formed, bridging of the particulate matter can be prevented satisfactorily. Any suitable means known in the art, for example, a mechanical stirring device or blowing of an inert fluid or the like, can be used as the stirring means. If a blowing means is provided at a position where the moving bed is formed, however, it is necessary to introduce the inert fluid at a flow rate, which is less than the minimum fluidization rate, so as not to impede the formation of the moving bed.

In the apparatus for continuous high temperature gas treatment of particulate matter according to the present invention, any suitable means known in the art can be used for supplying the starting particulate matter into the apparatus and discharging the finished form of the particulate matter from the apparatus. The use of a so-called screw feeder type feeding machine, or a so-called table feeder type feeding machine is preferred from the aspect of quantitativeness.

The apparatus for continuous high temperature gas treatment of particulate matter according to the present invention can be preferably used, particularly, for high temperature gas treatment, which should desirably be carried out uniformly for a constant time at a constant temperature, such as drying, firing, calcination, or high temperature gas treatment of organic or inorganic particulate matter, for example, high temperature gas treatment or calcination of cement or coke, drying or high temperature gas treatment of resinous particulate matter, or carbonization of resin or a particulate form of naturally occurring organic matter. This apparatus can be utilized, particularly, as an apparatus for producing a carbonaceous material for an electrode of a secondary battery.

The outline of a particulate matter treating method using the apparatus for continuous high temperature gas treatment of particulate matter according to the present invention is as follows:

The particulate matter is supplied from the upper part of the apparatus, and is moved downward within the apparatus. Simultaneously, the treating gas is supplied from the side part or lower part of the apparatus, and is moved upward within the apparatus. As a result, the particulate matter as a downward flow and the treating gas as an upward flow make countercurrent contact, whereby the particulate matter and the treating gas are mixed. By adjusting the feed rate of the treating gas to be less than the minimum fluidization rate of the particulate matter, the moving bed is formed in the lower part of the treatment chamber. On the other hand, heat is supplied to an upper part of the moving bed within the treatment chamber, whereupon the ascending rate of the treating gas at the upper part of the moving bed is adjusted to become equal to or higher than the minimum fluidization rate of the particulate matter but less than the terminal sedimentation rate of the particulate matter. By so doing, the fluidized bed is formed to be continuous with the upper part of the moving bed. Within the fluidized bed, the particulate matter is completely mixed with the treating gas, and maintains a constant temperature. The starting particulate matter continuously supplied there is instantaneously heated to the temperature within the fluidized bed. Then, the particulate matter descends to the moving bed in the lower part of the treatment chamber, where the particulate matter is subjected to high temperature gas treatment for a constant time in accordance with the temperature profile within the moving bed, and cooled by the cooling means in the lower part of the treatment chamber. In this manner, the particulate matter is continuously supplied from the upper part of the apparatus to the fluidized bed and the moving bed continuously formed within the treatment chamber, whereby high temperature gas treatment for a constant time and at the desired temperature progresses as the particulate matter descends. When the particulate matter arrives at the cooling chamber in the lower part of the treatment chamber, it is cooled by the cooling means. The particulate matter after treatment is discharged from the lower part of the apparatus. The blowing-in amount and temperature of the feed gas, and the heating and/or cooling of each part within the apparatus are adjusted, as appropriate, so that such treatment can be performed in the desired state.

According to the present invention, there is provided a method for producing a carbonaceous material for an electrode of a secondary battery, comprising: supplying pre-fired carbon as starting particulate matter; supplying a gas including a nitrogen gas and/or a chlorine gas as a treating gas; and heating a treatment chamber at a range of 500° C. to 3000° C., preferably a range of 800° C. to 2000° C., to form a moving bed and a fluidized bed within the treatment chamber so as to be continuous with each other, and treating the particulate matter, with the residence time of the particulate matter and the treating gas being set at a range of 0.1 to 10 hours, preferably a range of 0.3 to 2 hours. The residence time of the particulate matter and the treating gas can be controlled by adjusting the amount of product extraction or the amounts of supply of the particulate matter and the treating gas such that the height position of the powder surface of the moving bed within the treatment chamber, which is detected by the stationary pressure detector, maintains a constant value.

DESCRIPTION OF THE REFERENCE NUMERALS AND SYMBOLS

1: Starting particulate matter supply port (starting material supply port)
2: Treating gas supply port (gas diffuser)
3: Product discharge port
4: Treatment chamber
4a: Moving bed
4b: Fluidized bed
5: Gas-solid separation chamber
6: Cooling chamber
7: Heating means
8: Cooling means (cooling jacket)
9: Position detecting means (static pressure detector LIC)
10: Temperature detecting means (thermocouple TIC)
11: Stirring means 12: Three-dimensional structure (heat shielding plate)
13, 13a, 13b: Three-dimensional structure (for promoting heating of particulate matter)
M: Motor
31, 41: Firing chamber
32: Particulate matter
34: Gas diffusing plate
42: Starting material supply port
33, 43: Gas supply port
35, 44: Heater
45: Product discharge port
37, 46: Exhaust gas outlet
47: Cooler
36, 48: Temperature controller

DETAILED DESCRIPTION OF THE INVENTION

The present invention will be described in further detail by reference to the accompanying drawings, but the present invention is in no way limited to them.

Figure 1:
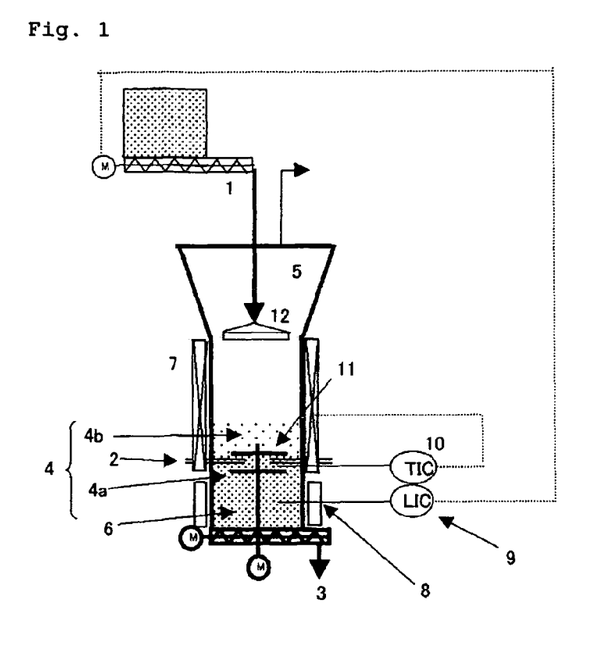
FIG. 1 is a schematic sectional view showing an embodiment of an apparatus for continuous high temperature gas treatment of particulate matter according to the present invention.

FIG. 1 is a schematic sectional view showing an embodiment of an apparatus for continuous high temperature gas treatment of particulate matter according to the present invention. In FIG. 1, the apparatus for continuous high temperature gas treatment of particulate matter comprises a starting material supply port 1 through which starting particulate matter is supplied from an upper part of the apparatus; a treating gas supply port 2 (in FIG. 1, a gas diffuser) through which a treating gas is supplied; a product discharge port 3 through which a product after treatment is discharged from a lower part of the apparatus; a treatment chamber 4 in which the particulate matter is treated with the treating gas; a gas-solid separation chamber 5 provided in fluid communication with an upper part of the treatment chamber 4; and a cooling chamber 6 provided in fluid communication with a lower part of the treatment chamber 4. A heating means 7 is provided on the outer periphery of an upper part of the treatment chamber 4, and a cooling means 8 (cooling jacket) is provided on the outer periphery of the cooling chamber 6. During operation of the apparatus, a moving bed 4a is formed in a lower part of the treatment chamber 4, and a fluidized bed 4b is formed to be continuous with an upper part of the moving bed 4a.

In the apparatus for continuous high temperature gas treatment of particulate matter shown in FIG. 1, a position detecting means 9 (in FIG. 1, a static pressure detector) for detecting the altitudinal or height positions of the moving bed 4a and the fluidized bed 4b formed during operation of the apparatus is provided in the treatment chamber 4, and the amount of product discharge from a starting particulate matter supply mechanism, such as a screw feeder or a table feeder, or the product discharge port 3 is controlled based on the heights of the beds detected by the position detecting means 9. Furthermore, a thermocouple 10 for measuring the temperatures of the moving bed 4a and the fluidized bed 4b within the treatment chamber 4 is inserted. A stirring means 11 (mechanical rotating and stirring device) is provided in a lower part of the treatment chamber 4 to stir the treating gas and the particulate matter. A heat shielding plate 12, which is a conical three-dimensional structure as a barrier to heat transfer from the treatment chamber 4 to the gas-solid separation chamber 5, is provided between the treatment chamber 4 and the gas-solid separation chamber 5, and the cross-sectional area of the gas-solid separation chamber 5 is larger than the cross-sectional area of the treatment chamber 4.

Figure 2:
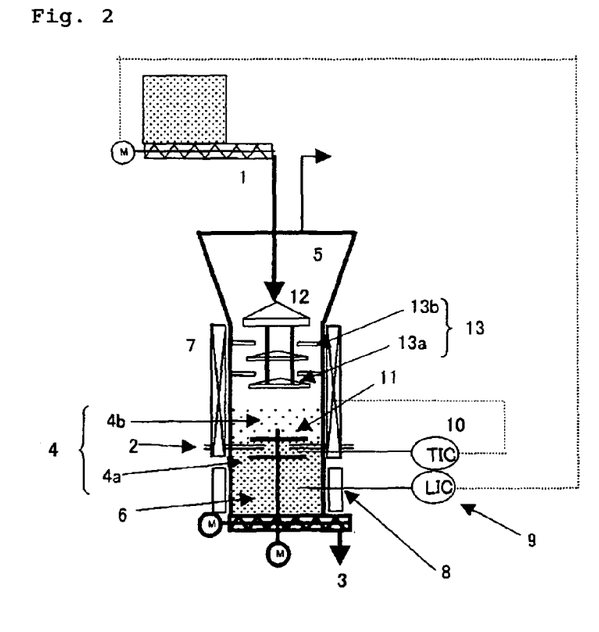
FIG. 2 is a schematic sectional view showing another embodiment of an apparatus for continuous high temperature gas treatment of particulate matter according to the present invention.

FIG. 2 is a schematic sectional view showing another embodiment of the present invention. The same components as those in the apparatus shown in FIG. 1 are indicated by the same numerals or symbols as in FIG. 1, and explanations for them are omitted, with only different portions being described.

The apparatus for continuous high temperature gas treatment of particulate matter shown in FIG. 2 has a plurality of three-dimensional structures 13 provided in an upper part of the treatment chamber 4, in addition to the components of the apparatus for continuous high temperature gas treatment of particulate matter shown in FIG. 1, the plurality of three-dimensional structures 13 being arranged in a staggered manner on the wall surface side and the central side of the treatment chamber 4 for sufficient heating of the supplied particulate matter. The conical three-dimensional structure at the uppermost stage also functions as the heat shielding plate 12. Conical three-dimensional structures 13a located below the heat shielding plate 12 in a central part of the treatment chamber 4, and three-dimensional structures 13b located on the wall surface side of the treatment chamber 4 and slightly inclined toward the center of the treatment chamber 4 are disposed zigzag, whereby the descending particulate matter falls in a stepped form and is prevented from dropping instantaneously. Thus, the residence time within the treatment chamber 4 can be prolonged, and the particulate matter can be sufficiently heated.

The apparatus for continuous high temperature gas treatment of particulate matter according to the present invention is not limited to the embodiments illustrated in FIGS. 1 and 2, and can be subject to various changes and modifications. For example, a combination of plural heaters may be used as the heating means 7 provided on the outer periphery of the treatment chamber 4, whereby the heating temperature can be changed stepwise. Moreover, progressive irregularities may be provided on the inner wall of the treatment chamber 4, whereby the descent of the particulate matter can be delayed to promote heat transfer to the particulate matter.

Hereinbelow, examples of utilizing the apparatus for high temperature gas treatment of particulate matter according to the present invention will be described by taking the production of a carbonaceous material for an electrode of a secondary battery as an example.

EXAMPLE 1

A petroleum pitch (68 kg) having a softening point of 210° C., a quinoline insoluble content of 1% by mass, and a H/C atom ratio of 0.63, and 32 kg of naphthalene were charged into a pressure vessel equipped with an agitating blade and having an internal volume of 300 liters. The charge was melted and mixed with heating at 190° C., then cooled to a range of 80 to 90° C. and extruded to obtain a string-shaped formed body having a diameter of about 50 µm. This string-shaped formed body was crushed such that the crushed pieces had a diameter to length ratio of about 1.5. The resulting crushed product was introduced into an aqueous solution of 0.53% by mass of polyvinyl alcohol (saponification degree of 88%) heated to 93° C., and dispersed therein with stirring, followed by cooling to obtain a spherical pitch formed body slurry. Most water was removed from the spherical pitch formed body slurry by filtration, and naphthalene in the pitch formed body was removed using n-hexane having a mass about 6 times the mass of the spherical pitch formed body to obtain a porous spherical pitch. The porous spherical pitch was raised in temperature to 260° C. with the use of a fluidized bed, with heated air being passed therethrough. The system was held for 1 hour at 260° C. for oxidation, to obtain a porous spherical pitch formed body infusible by heat. The resulting infusible porous pitch formed body was heated to 600° C. at a heating rate of 600° C./hr in a nitrogen gas stream, held for 1 hour at this temperature, and then cooled to obtain pre-fired carbon.

The pre-fired carbon was crushed to an average particle size of 10 μm, and treated in the following manner using the apparatus for continuous high temperature gas treatment of particulate matter shown in FIG. 1: A nitrogen gas as a fluidizing gas was flowed at 33 NL/min, and the pre-fired carbon was supplied at a rate of 20 kg/h. The pre-fired carbon was continuously fired, with the height of the powder surface of the fluidized bed being detected by the stationary pressure detector and the amount of product withdrawn being adjusted so that a holdup in a region where the temperature of the moving bed and the fluidized bed was 1300° C. would be 40 kg corresponding to a 2-hour residence time. A period of 7 hours was taken from charging of the starting pre-fired carbon into the apparatus until withdrawal of the desired fired product from the apparatus. The amount of nitrogen used was 100 NL per kg of the pre-fired carbon.

COMPARATIVE EXAMPLE 1

Figure 3:
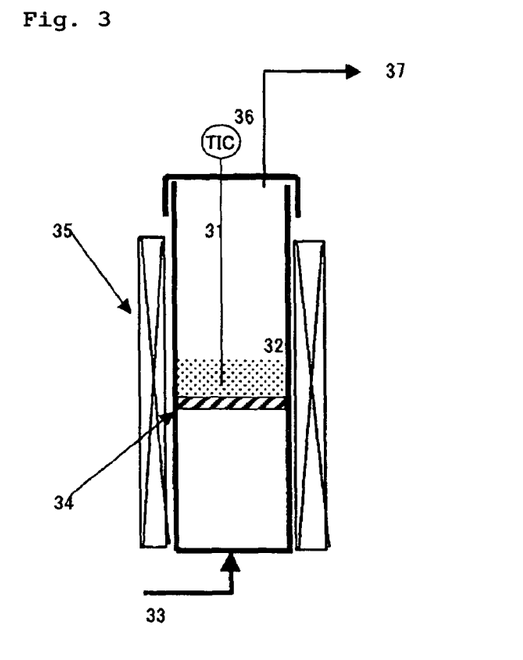
FIG. 3 is a schematic sectional view showing a conventional batchwise vertical tubular furnace.

The pre-fired carbon crushed to an average particle size of 10 μm described in Example 1 was increased in temperature at a heating rate of 10° C./min, with a nitrogen gas being flowed at 8.3 NL/min for kg of the pre-fired carbon, in a batchwise vertical tubular furnace having a porous trap in the center of the tube as shown in FIG. 3. When the temperature within the furnace reached 1300° C., the system was held for 2 hours for desired firing. Then, the system was cooled to produce a carbonaceous material. A period of 16 hours was required from charging of the starting pre-fired carbon until withdrawal of the desired fired product. The amount of nitrogen used was 8000 NL per kg of the pre-fired carbon.

COMPARATIVE EXAMPLE 2

Figure 4:
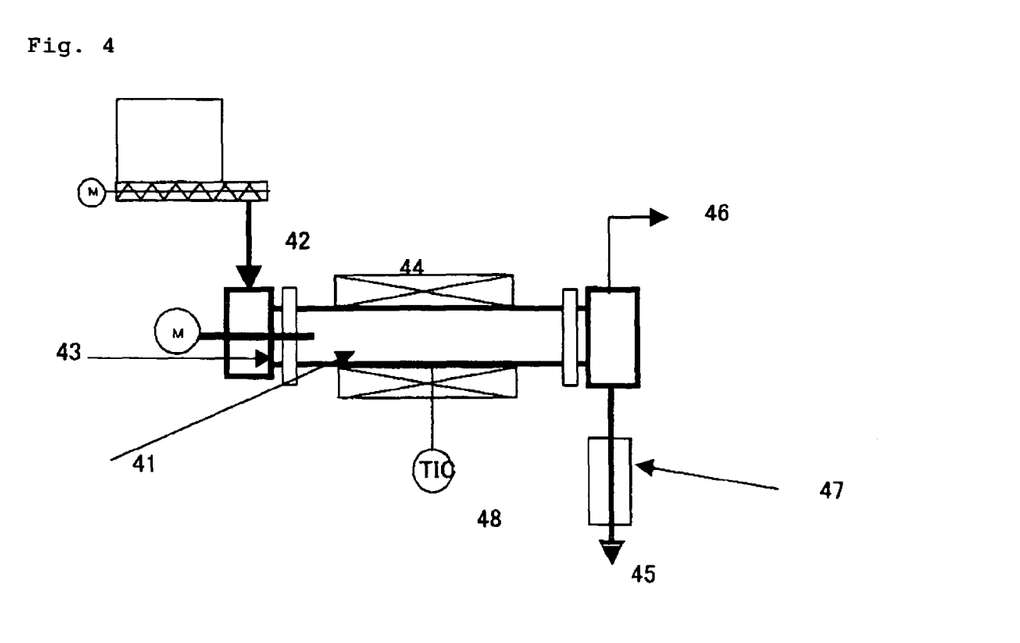
FIG. 4 is a schematic sectional view showing a conventional continuous rotary kiln.

The pre-fired carbon crushed to an average particle size of 10 μm described in Example 1 was supplied at a rate of 1 kg/h, with a nitrogen gas being flowed at 1.7 NL/min, in a continuous rotary kiln as shown in FIG. 4. The supplied pre-fired carbon was continuously fired so as to be held for 2 hours at an in-furnace temperature of 1300° C. in a heating section. A period of 2.5 hours was required from charging of the starting pre-fired carbon until withdrawal of the desired fired product. The amount of nitrogen used was 100 NL per kg of the pre-fired carbon.

COMPARATIVE EXAMPLE 3

The pre-fired carbon crushed to an average particle size of 10 μm described in Example 1 was supplied at a rate of 1 kg/h, with a nitrogen gas being flowed at 4.2 NL/min, in a continuous rotary kiln as shown in FIG. 4. The supplied pre-fired carbon was continuously fired so as to be held for 5 hours at an in-furnace temperature of 1300° C. in a heating section. A period of 5.5 hours was required from charging of the starting pre-fired carbon until withdrawal of the desired fired product. The amount of nitrogen used was 250 NL per kg of the pre-fired carbon.

EXAMPLE 2

The pre-fired carbon crushed to an average particle size of 10 μm described in Example 1 was treated in the following manner using the apparatus for continuous high temperature gas treatment of particulate matter shown in FIG. 2: A nitrogen gas as a fluidizing gas was flowed at 280 NL/min, a chlorine gas as a treating gas was flowed at 50 NL/min, and the pre-fired carbon was supplied at a rate of 50 kg/h. The pre-fired carbon was continuously fired, with the height of the powder surface of the fluidized bed being detected by the stationary pressure detector and the amount of product extraction being adjusted so that a holdup in a region where the temperature of the moving bed and the fluidized bed was 1300° C. would be 17 kg corresponding to a residence time of 20 minutes. A period of 2.3 hours was required from charging of the starting pre-fired carbon until withdrawal of the desired fired product. The amount of nitrogen used was 340 NL, and the amount of chlorine used was 60 NL, per kg of the pre-fired carbon.

COMPARATIVE EXAMPLE 4

The pre-fired carbon crushed to an average particle size of 10 μm described in Example 1 was raised in temperature at a heating rate of 10° C./min, with a nitrogen gas being flowed at 13.3 NL/min for kg of the pre-fired carbon, in a batchwise vertical tubular furnace having a porous trap in the center of the tube as shown in FIG. 3. When the temperature within the furnace reached 900° C., the nitrogen gas was switched to a mixed gas comprising 11.3 NL/min of a nitrogen gas and 2 NL/min of a chlorine gas. When the temperature within the furnace reached 1100° C., the mixed gas was switched to 12.3 NL/min of a nitrogen gas and 1 NL/min of a chlorine gas. When the temperature within the furnace reached 1300° C., the gas mixture was switched to 13.3 NL/min of a nitrogen gas. Under these conditions, the pre-fired carbon was held for 20 minutes, whereafter the nitrogen gas was switched to 8.3 NL/min, and the system was cooled to produce a carbonaceous material. A period of 16 hours was required from charging of the starting pre-fired carbon until withdrawal of the desired fired product. The amount of nitrogen used was 8600 NL, and the amount of chlorine used was 60 NL, per kg of the pre-fired carbon.

COMPARATIVE EXAMPLE 5

The pre-fired carbon crushed to an average particle size of 10 μm described in Example 1 was treated in the following manner using the continuous rotary kiln shown in FIG. 4: A nitrogen gas as a fluidizing gas was flowed at 5.7 NL/min, a chlorine gas as a treating gas was flowed at 1 NL/min, and the pre-fired carbon was supplied at a rate of 1 kg/h. The pre-fired carbon was continuously fired, with the height position of the powder surface of the fluidized bed being detected by the stationary pressure detector and the amount of product extraction being adjusted so that a holdup in a region where the temperature of the moving bed and the fluidized bed was 1300° C. would be 17 kg corresponding to a residence time of 20 minutes. A period of 0.8 hour was required from charging of the starting pre-fired carbon until withdrawal of the desired fired product. The amount of nitrogen used was 340 NL, and the amount of chlorine used was 60 NL, per kg of the pre-fired carbon.

(Method of Preparing a Sample Cell and Evaluation of Electrical Charge and Discharge Amounts)

Using each of the carbonaceous materials obtained in each of the Examples and Comparative Examples described above, a nonaqueous solvent-based secondary battery was prepared, and its properties were evaluated, in the manner described below.

The carbonaceous material produced by the apparatus for continuous high temperature gas treatment of particulate matter according to the present invention is suitable for use as a negative electrode of a nonaqueous solvent secondary battery. However, counter electrode lithium evaluation was made in order to evaluate the charged capacity, the discharged capacity, and the non-discharged capacity of a battery active material with satisfactory accuracy, without being affected by variations in the performance of a counter electrode. That is, a lithium secondary battery was constructed using a lithium metal with stable properties as a negative electrode, and using the carbonaceous material, which had been obtained by each of the aforementioned Examples and Comparative Examples, as a positive electrode, and the properties of the lithium secondary battery were evaluated.

The positive electrode (carbon electrode) was produced in the following manner: The carbonaceous material (95 parts by mass) produced in each of the Examples and Comparative Examples and 5 parts by weight of polyvinylidene fluoride were formed into a paste with the addition of N-methyl-2-pyrrolidone. The paste was uniformly coated on a copper foil, and the coated copper foil was dried for 30 minutes at 130° C. in an inert atmosphere. A disk with a diameter of 15 mm was punched out from the resulting sheet-shaped electrode, and was pressed to obtain an electrode. The electrode was prepared such that the weight of the carbon material therein was about 20 mg, and pressing was performed such that the filling factor of the carbon material was about 67%.

Preparation of the negative electrode (lithium electrode) was performed within a glove box in an Ar atmosphere. A stainless steel net disk with a diameter of 17 mm was spot-welded to an outer lid of a can for a 2016-size coin-shaped battery. Then, a disk with a diameter of 15 mm punched out of a 0.5 mm thick metallic lithium thin sheet was pressure-bonded to the stainless steel net disk to form a negative electrode.

Using the thus produced positive electrode and negative electrode, a 2016-size coin-shaped nonaqueous solvent-based lithium secondary battery was assembled in the Ar glove box using a polyethylene gasket and using, as an electrolytic solution, a mixed solvent comprising ethylene carbonate, dimethyl carbonate, and ethyl methyl carbonate at a volume ratio of 3:4:4 and incorporating $LiPF_6$ at a rate of 1 mol/liter; and using a microporous membrane of polypropylene as a separator. In the lithium secondary battery, the carbonaceous material was subjected to doping and undoping with lithium, and capacities on this occasion were determined.

The doping was performed by the constant current and constant voltage method. Constant current charge was carried out at a current density of $0.5 \text{ mA/cm}^2$ until 0 V was reached. At a time when 0 V was reached, the current value was attenuated, with the voltage kept constant. Charge was completed at a time when 20 μA was reached. The quantity of electricity at this time was divided by the weight of the carbonaceous material used to obtain a value, which was defined as charged capacity, and expressed in units of mAh/g. Then, in a similar manner, a current was passed in the opposite direction for undoping of the lithium doped into the carbonaceous material. The undoping was performed at a current density of $0.5 \text{ mA/cm}^2$, and a terminal voltage of 1.5V was taken as a cut-off voltage. The quantity of electricity at this time was defined as discharged capacity, and expressed in units of mAh/g. Then, irreversible capacity was obtained as the difference between the charged capacity and the discharged capacity. The discharged capacity was divided by the charged capacity, and the resulting quotient was multiplied by 100 to obtain a discharge efficiency (%). This is a value indicating how much of the active material was used effectively. The measurements of these properties were made at 25° C.

The battery properties of each of the lithium secondary batteries using the carbonaceous material as the positive electrode, determined in the manner described above, are shown in Table 1.

TABLE 1

Properties of secondary batteries using various carbonaceous materials as positive electrodes

|  | Amount of doping Ah/kg | Amount of undoping Ah/kg | Irreversible capacity Ah/kg | Amounts of nitrogen and chlorine based on amount of starting material supplied | |
|---|---|---|---|---|---|
|  |  |  |  | NL/kg | |
| Ex.1 | 320 | 273 | 47 | 100 | 0 |
| Comp.Ex.1 | 323 | 275 | 48 | 8000 | 0 |
| Comp.Ex.2 | 363 | 300 | 63 | 100 | 0 |
| Comp.Ex.3 | 308 | 260 | 48 | 250 | 0 |
| Ex.2 | 522 | 448 | 73 | 340 | 60 |
| Comp.Ex.4 | 517 | 442 | 75 | 8600 | 60 |
| Comp.Ex.5 | 518 | 425 | 93 | 340 | 60 |

In Example 1 and Comparative Example 1, the amount of doping, the amount of undoping, and the irreversible capacity obtained were comparable. In Comparative Example 1, however, the batch operation was performed, so that a large amount of nitrogen was consumed in order to maintain the nitrogen atmosphere during heating and cooling, and the amount of nitrogen used per unit amount treated was 80 times as large. In association with this, a larger quantity of heat is needed for heating nitrogen, leading to a low production efficiency.

In Comparative Example 2, the treatment was performed using the rotary kiln by the same method and under the same conditions as in Example 1. However, the amount of doping and the amount of undoping were about 10% larger, and the irreversible capacity was also 34% greater, than in Example 1. The longer the firing time, the smaller the values of the amount of doping, the amount of undoping, and the irreversible capacity tend to become, if the firing temperature is the same. The change rates decrease as firing progresses. The rotary kiln of Comparative Example 2 undergoes distribution of the treating time due to the performance of the apparatus. Thus, the products discharged from the apparatus include those with a longer treating time and those with a shorter treating time in a mixed state. Even if the treating time distribution shows a normal distribution, the degree of increases in the respective values in the products with a shorter treating time than the average treating time is markedly higher than in the products with a longer treating time, in the light of the relationship between the treating time and the change rates in the respective values. In such a situation where the products with a wide distribution of the treating time exist mixedly, the products having large values of the amount of doping, the amount of undoping, and the irreversible capacity are obtained, even if the average treating time is consistent.

Comparative Example 3 is an example in which the apparatus and method of Comparative Example 2 were used, and the average treating time was set at 5 hours, i.e., a time which was 2.5 times as long as in Comparative Example 2, so that the value of the irreversible capacity was equated with those of Example 1 and Comparative Example 1. In this case, the amount of treatment was 1/2.5 times and, in order to maintain the nitrogen atmosphere within the apparatus, the amount of nitrogen used per unit amount of the starting material supplied was 2.5 times as large, thus resulting in a lower production efficiency than in Comparative Example 2. The amount of doping and the amount of undoping were about 5% smaller than in Example 1 and Comparative Example 1. This is because since the treating time is distributed owing to the performance of the apparatus, similar to Comparative Example 2, the values of the amount of doping and the amount of undoping cannot be rendered consistent, even if the value of the irreversible capacity is made consistent by prolonging the average treating time.

The performance of the lithium secondary battery are more preferred as the amount of doping and the amount of undoping increase, if the irreversible capacity is the same. The products treated for a constant period of time at a constant temperature, as in Example 1 and Comparative Example 1, can be said to be more preferable in terms of properties than the products treated with a broad treating time distribution as in Comparative Examples 2 and 3. Compared with Comparative Example 1, Example 1 can perform treatment by the continuous process, so that the amount of nitrogen used and the quantity of heat consumed per unit amount treated are small, and the production efficiency is high. This is preferred.

Example 2 and Comparative Examples 4 and 5 are examples in which a chlorine gas acted on the treated particulate matter in the temperature region at 900° C. to 1300° C. during firing, thereby improving the battery capacity. Example 2 adopted the configuration of FIG. 2 in which the three-dimensional structures (staggered horizontal shelves 13) for promoting heating of the starting material supplied from above were installed in a space section located above the fluidized bed within the apparatus of FIG. 1. Because of this configuration, the supplied starting particulate matter is heated to 900° C. before arriving at the fluidized bed. The chlorine gas together with nitrogen as the fluidizing gas is flowed upward from the region at 1300° C. within the bed toward the temperature rise and heating region, whereby treatment with the chlorine gas is performed up to the region at 900° C. located at the upper region of the fluidized bed. Chlorine instantaneously reacts with hydrogen of the firing exhaust gas to form hydrochloric acid. Thus, chlorine does not act on the upper region at 900° C. or below, and the same treatment as in Comparative Example 4 becomes possible. Consequently, Example 2 obtained the amount of doping, the amount of undoping, and the irreversible capacity which were similar to those in Comparative Example 4 performed batchwise. Similar to the comparison between Example 1 and Comparative Example 1, moreover, Example 2 performed by the continuous process was able to markedly cut down on the amount of nitrogen used, in comparison with Comparative Example 4 performed batchwise.

Comparative Example 5 performed treatment under the same conditions and by the same method as in Example 2. However, Comparative Example 5 had the irreversible capacity 25% greater, and the amount of undoping 5% less, than in Example 2, showing a lower effect of improving battery capacity. In Comparative Example 5, an undesirable distribution is present in the residence time of the starting particulate matter within the apparatus. In addition, the chlorine gas spreads everywhere within the apparatus, and thus also contacts the starting particulate matter at 900° C. or below. As a result, a sufficient effect of improving performance by chlorine at a high temperature was not obtained.

According to the present invention, as described above, there are provided an apparatus for continuous high temperature gas treatment of particulate matter, which can perform the high temperature gas treatment of particulate matter for a constant period of time at a constant temperature in a continuous system affording a high production efficiency; and a method for treating particulate matter with the use of the apparatus for continuous high temperature gas treatment of particulate matter. The apparatus and method for continuous high temperature gas treatment of particulate matter according to the present invention, in particular, are useful for the production of carbonaceous materials for electrodes of secondary batteries.

The invention claimed is:

1. An apparatus for continuous high temperature gas treatment of particulate matter, the apparatus comprising:
   a starting material supply port through which starting particulate matter is supplied from an upper part of the apparatus;
   a product discharge port through which a product after treatment is discharged from a lower part of the apparatus;
   a treatment chamber in which the particulate matter is treated at a high temperature in an atmosphere of a treatment gas, the treatment chamber comprising (a) a three dimensional structure including a plurality of conical structures and/or (b) a plurality of three-dimensional structures provided in a staggered manner on a wall surface and in a central portion of the treatment chamber in an upper part of the treatment chamber;
   at least one external heater provided in the upper part of the treatment chamber,
   a cooling chamber in fluid communication with the treatment chamber at a lower part of the treatment chamber, the cooling chamber having an external cooler or a heat exchanger; and
   a treatment gas supply port through which treatment gas is supplied, the treatment gas supply port being provided in a lower part of the external heater and above the external cooler,
   wherein during operation of the apparatus, in the lower part of the treatment chamber, the particulate matter is cooled by the external cooler or the heat exchanger and the treatment gas flow is adjusted to maintain an upward flow rate of the treatment gas at a level less than a minimum fluidization rate, whereby a moving bed is formed, whereas in the upper part of the treatment chamber, the particulate matter is heated by heat from the external heater and the treatment gas flow is adjusted to maintain the upward flow rate of the treatment gas at a level higher than the minimum fluidization rate, whereby a fluidized bed is formed and maintained, and the fluidized bed is formed to be continuous with an upper part of the moving bed.

2. The apparatus for continuous high temperature gas treatment of particulate matter according to claim 1, further comprising a gas-solid separation chamber provided in fluid communication with the upper part of the treatment chamber.

3. The apparatus for continuous high temperature gas treatment of particulate matter according to claim 1, wherein position detecting means for detecting a height position of the moving bed and/or the fluidized bed formed during operation of the apparatus is further provided in the treatment chamber.

4. The apparatus for continuous high temperature gas treatment of particulate matter according to claim 3, wherein the position detecting means is a static pressure detector.

5. The apparatus for continuous high temperature gas treatment of particulate matter according to claim 1, further comprising a gas-solid separation chamber provided in fluid communication with the upper part of the treatment chamber, and wherein the three-dimensional structure includes a heat shielding plate provided between the treatment chamber and the gas-solid separation chamber and serving as a barrier to heat transfer from the treatment chamber to the gas-solid separation chamber.

6. The apparatus for continuous high temperature gas treatment of particulate matter according to claim 5, wherein the heat shielding plate has a cross-sectional area which is 20 to 90% of a cross-sectional area of the treatment chamber.

7. The apparatus for continuous high temperature gas treatment of particulate matter according to claim 2, wherein a cross-sectional area of the gas-solid separation chamber is larger than a cross-sectional area of the treatment chamber.

8. The apparatus for continuous high temperature gas treatment of particulate matter according to claim 1, wherein stirring means is further provided in the treatment chamber.

9. The apparatus for continuous high temperature gas treatment of particulate matter according to claim 1, which is an apparatus for producing a carbonaceous material for an electrode of a secondary battery.

10. The apparatus for continuous high temperature gas treatment of particulate matter according to claim 1, wherein a side surface of the conical structure has an inclination angle of 5 to 60 degrees.

11. An apparatus for continuous high temperature gas treatment of particulate matter, the apparatus comprising:
   a starting material supply port through which starting particulate matter is supplied from an upper part of the apparatus;
   a product discharge port through which a product after treatment is discharged from a lower part of the apparatus;
   a treatment chamber in which the particulate matter is treated at a high temperature in an atmosphere of a treatment gas, the treatment chamber comprising (a) a three-dimensional structure including at least one conical structure and/or (b) a plurality of three-dimensional structures provided in a staggered manner on a wall surface and in a central portion of the treatment chamber in an upper part of the treatment chamber;
   at least one external heater provided in the upper part of the treatment chamber,
   a cooling chamber in fluid communication with the treatment chamber at a lower part of the treatment chamber, the cooling chamber having an external cooler or a heat exchanger; and
   a treatment gas supply port through which the treatment gas is supplied, the treatment gas supply port being provided in a lower part of the external heater and above the external cooler,
   wherein during operation of the apparatus, in the lower part of the treatment chamber, the particulate matter is cooled by the external cooler or the heat exchanger and the treatment gas flow is adjusted to maintain an upward flow rate of the treatment gas at a level less than a minimum fluidization rate, whereby a moving bed is formed, whereas in the upper part of the treatment chamber, the particulate matter is heated by heat from the external heater and the treatment gas flow is adjusted to maintain the upward flow rate of the treatment gas at a level higher than the minimum fluidization rate, whereby a fluidized bed is formed and maintained, and the fluidized bed is formed to be continuous with an upper part of the moving bed.

12. The apparatus for continuous high temperature gas treatment of particulate matter according to claim 11, further comprising a gas-solid separation chamber provided in fluid communication with the upper part of the treatment chamber.

13. The apparatus for continuous high temperature gas treatment of particulate matter according to claim 11, wherein position detecting means for detecting a height position of the moving bed and/or the fluidized bed formed during operation of the apparatus is further provided in the treatment chamber.

14. The apparatus for continuous high temperature gas treatment of particulate matter according to claim 13, wherein the position detecting means is a static pressure detector.

15. The apparatus for continuous high temperature gas treatment of particulate matter according to claim 11, further comprising a gas-solid separation chamber provided in fluid communication with the upper part of the treatment chamber, and wherein the three-dimensional structure includes a heat shielding plate provided between the treatment chamber and the gas-solid separation chamber and serving as a barrier to heat transfer from the treatment chamber to the gas-solid separation chamber.

16. The apparatus for continuous high temperature gas treatment of particulate matter according to claim 15, wherein the heat shielding plate has a cross-sectional area which is 20 to 90% of a cross-sectional area of the treatment chamber.

17. The apparatus for continuous high temperature gas treatment of particulate matter according to claim 12, wherein a cross-sectional area of the gas-solid separation chamber is larger than a cross-sectional area of the treatment chamber.

18. The apparatus for continuous high temperature gas treatment of particulate matter according to claim 11, wherein stirring means is further provided in the treatment chamber.

19. The apparatus for continuous high temperature gas treatment of particulate matter according to claim 11, which is an apparatus for producing a carbonaceous material for an electrode of a secondary battery.

20. The apparatus for continuous high temperature gas treatment of particulate matter according to claim 11, wherein a side surface of the conical structure has an inclination angle of 5 to 60 degrees.

* * * * *